United States Patent
Hirata et al.

(10) Patent No.: US 8,940,088 B2
(45) Date of Patent: Jan. 27, 2015

(54) AQUEOUS INK COMPOSITION AND RECORDED ARTICLE FORMED BY USING THE SAME

(75) Inventors: Shiki Hirata, Shiojiri (JP); Takayoshi Kagata, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/107,369

(22) Filed: May 13, 2011

(65) Prior Publication Data

US 2011/0281089 A1    Nov. 17, 2011

(30) Foreign Application Priority Data

May 14, 2010    (JP) ................................. 2010-111823

(51) Int. Cl.
*C09D 11/02*    (2014.01)
*C09D 11/38*    (2014.01)

(52) U.S. Cl.
CPC ...................................... *C09D 11/38* (2013.01)
USPC .................... 106/31.86; 106/31.6; 106/31.65; 106/31.9

(58) Field of Classification Search
USPC .......................... 106/31.6, 31.9, 31.86, 31.65
See application file for complete search history.

(56) References Cited

U.S. PATENT DOCUMENTS

| | | | |
|---|---|---|---|
| 7,763,108 B2 | 7/2010 | Oyanagi et al. | |
| 2002/0196322 A1 | 12/2002 | Fujii et al. | |
| 2005/0214480 A1* | 9/2005 | Garbar et al. | 428/1.1 |
| 2006/0044382 A1* | 3/2006 | Guan et al. | 347/105 |
| 2006/0098069 A1* | 5/2006 | Cornell et al. | 347/101 |
| 2007/0105979 A1* | 5/2007 | Sun | 523/160 |
| 2007/0146454 A1* | 6/2007 | Doi et al. | 347/100 |
| 2007/0276060 A1* | 11/2007 | Stancik et al. | 523/160 |
| 2008/0041269 A1* | 2/2008 | Bogale et al. | 106/31.27 |
| 2008/0145628 A1 | 6/2008 | Oyanagi et al. | |
| 2008/0236444 A1 | 10/2008 | Enciu et al. | |
| 2008/0250970 A1 | 10/2008 | Oyanagi et al. | |
| 2008/0257211 A1* | 10/2008 | Oriakhi | 106/31.65 |
| 2009/0053415 A1 | 2/2009 | Isobe | |
| 2011/0279611 A1* | 11/2011 | Kagata et al. | 347/100 |

FOREIGN PATENT DOCUMENTS

| | | |
|---|---|---|
| CN | 101486852 A | 7/2009 |
| CN | 101560349 A | 10/2009 |
| EP | 776952 A2 * | 6/1997 |
| JP | 2003-306625 A | 10/2003 |
| JP | 2005-120226 A | 5/2005 |
| JP | 2007-297423 A | 11/2007 |
| JP | 2008174712 A | 7/2008 |
| JP | 2008-297323 A | 12/2008 |
| JP | 2009-227736 A | 10/2009 |
| WO | 2006-066033 A1 | 6/2006 |
| WO | 2006/112031 A1 | 10/2006 |
| WO | 2010-028285 A | 3/2010 |

OTHER PUBLICATIONS

European Search Report, Jul. 25, 2011.

* cited by examiner

*Primary Examiner* — Veronica F Faison
(74) *Attorney, Agent, or Firm* — Nutter McClennen & Fish LLP; John J. Penny, Jr.

(57) ABSTRACT

In an advantage of embodiments of the invention, there is provided an aqueous ink composition at least containing water, silver particles, and a humectant, and the humectant is at least one member selected from glycerols, glycols, and saccharide.

4 Claims, No Drawings

AQUEOUS INK COMPOSITION AND RECORDED ARTICLE FORMED BY USING THE SAME

Priority is claimed under 35 U.S.C. §119 to Japanese Application No. 2010-111823 filed on May 14, 2010 which is hereby incorporated by reference in its entirety.

BACKGROUND

1. Technical Field

The present invention relates to an aqueous ink composition and a recorded article that is formed by using such a composition.

2. Related Art

In typical, the following techniques have been employed as a technique by which a coating film having metallic gloss is formed on a printing medium: a technique which utilizes a printing ink containing gold powder or silver powder that is prepared from brass particles, aluminum particles, or the like as a pigment; foil stamping printing which utilizes metal foil; and a thermal transfer technique which utilizes metal foil.

In recent years, these techniques have been frequently applied to ink jet printing. In an example of such applications, metallic printing is employed, and development of an ink having metallic gloss has been advanced. For example, JP-A-2008-174712 discloses an aluminum pigment dispersion liquid which contains an organic solvent, such as alkylene glycol, as a basic component and discloses a nonaqueous ink composition containing such an aluminum pigment dispersion liquid.

On the other hand, in terms of global environment and impact on the human body, development of an aqueous ink composition is actually desired rather than development of the organic solvent-based nonaqueous ink composition. In the case of using an aqueous ink, a humectant is generally added in terms of adjusting the viscosity of the aqueous ink and preventing the aqueous ink from being dried in a printer.

However, in the case of using an aqueous ink containing silver particles as a metallic pigment, a problem is caused, in which the metallic gloss of an image that is recorded on a recording medium is significantly varied depending on types of the humectant to be added.

SUMMARY

An advantage of some aspects of the invention is that it provides a silver particle-containing aqueous ink composition which can be used to overcome the above problem and which is used to print an image on a recording medium with the result that the image can be recorded so as to have excellent metallic gloss.

Embodiments of the invention are provided to overcome at least part of the above problem and can be provided so as to have the following aspects or applications.

According to a first aspect of the invention, there is provided an aqueous ink composition at least containing water, a silver particle, and a humectant. The humectant is at least one member selected from glycerols, glycols, and saccharide.

By virtue of the aqueous ink composition of this aspect, in the case where an image is printed on a recording medium, the image can be recorded so as to have excellent metallic gloss.

In the above aqueous ink composition, it is preferable that any one of glycerin and trimethylolpropane may be employed as the glycerols.

In the above aqueous ink composition, it is preferable that any one of triethylene glycol, hexylene glycol, propylene glycol, and polyethylene glycol may be employed as the glycerols.

In the above aqueous ink composition, it is preferable that the humectant may be contained in an amount that is in the range from 5 weight % to 20 weight %.

In the above aqueous ink composition, it is preferable that an average primary particle size of the silver particle may be in the range from 10 nm to 100 nm and that a particle size d90 of the silver particle in a grain size accumulation curve may be in the range from 50 nm to 1 μm.

In the above aqueous ink composition, a particle size d10 of the silver particle in a grain size accumulation curve may be in the range from 2 nm to 20 nm.

In the above aqueous ink composition, it is preferable that the silver particle may be subjected to surface treatment.

According to a second aspect of the invention, there is provided a recorded article on which an image is recorded by using the above aqueous ink composition.

DESCRIPTION OF EXEMPLARY EMBODIMENTS

Preferred embodiments of the invention will be hereinafter described. Each of the following embodiments to be described is an example of embodiments of the invention. Furthermore, embodiments of the invention are not limited to the following embodiments and may be variously modified without departing from the scope of the invention.

1. Aqueous Ink Composition

An aqueous ink composition of an embodiment of the invention contains water, silver particles, and a humectant.

The humectant is at least one member selected from glycerols, glycols, and saccharide.

1. 1. Silver Particles 1. 1. 1. Properties of Silver Particles

The aqueous ink composition of this embodiment contains silver particles. The silver particles refer to particles primarily containing silver and may contain another metallic element, carbon, oxygen, or the like as an accessory component. The silver particles preferably have silver purity greater than or equal to 80%, more preferably greater than or equal to 90%. The silver particles may be an alloy of silver and another metal (such as indium, palladium, or platinum). The silver particles may be contained in the aqueous ink composition in a colloidal state (particle colloid). In the case where silver particles are dispersed in a colloidal state, dispersibility is further improved, and the silver particle can, for example, contribute to improvement of the preservation stability of the aqueous ink composition.

Preferably, the silver particles contained in the aqueous ink composition of this embodiment each have an average primary particle size that is in the range from 10 nm to 100 nm, more preferably in the range from 15 nm to 50 nm. In the case where the average primary particle size falls within such ranges, good dispersibility of the silver particles in the aqueous ink composition is provided, and the preservation stability of the aqueous ink composition can be improved.

Preferably, in the silver particles contained in the aqueous ink composition of this embodiment, a particle size d90 in a grain size accumulation curve is in the range from 50 nm to 1 μm. Meanwhile, the grain size accumulation curve refers to a kind of curve that is obtained as a result of statistically processing the results of measurement through which the size and the contained number of the silver particles that are dispersed in the aqueous ink composition can be obtained. In the grain size accumulation curve that is herein mentioned, the lateral axis indicates the diameters of the particles, and the longitudinal axis indicates values (integrated values) that are obtained as a result of integrating weights of the particles (assuming that the particles have spherical shapes, the weights are obtained as a result of multiplying the volumes of the particles by the density of the particles and the number of the particles) in the order from a particle having a small diameter to a particle having a large diameter. The term "particle size d90 in a grain size accumulation curve" refers to a particle size that is obtained as follows: beginning with a particle having a small size, the weights of the particles are integrated; and when an accumulated weight percentage reaches 90 weight %, a particle size in this time is defined as the particle size d90. In this case, the diameters of the silver particles may be the diameters of the silver particles themselves or may be the diameters of colloidal particles in the case where the silver particles are dispersed in a colloidal state.

In addition, in the silver particles contained in the aqueous ink composition of this embodiment, a particle size d10 in a grain size accumulation curve is preferably in the range from 2 nm to 20 nm. By virtue of this preparation, good dispersibility of the silver particles in the aqueous ink composition can be provided, and, for example, the preservation stability of the aqueous ink composition can be therefore further improved. In this case, the term "particle size d10 in a grain size accumulation curve" refers to a particle size that is obtained as follows: beginning with a particle having a small size, the weights of the particles are integrated; and when an accumulated weight percentage reaches 10 weight %, a particle size in this time is defined as the particle size d10.

For example, the average primary particle size and grain size accumulation curve of the silver particles contained in the aqueous ink composition of this embodiment can be obtained by using a particle size distribution analyzer based on dynamic light scattering. In the dynamic light scattering, dispersed silver particles are irradiated with laser light, and the scattered light resulting from the irradiation is observed with a photon detector. In general, the dispersed silver particles normally have Brownian motion. The larger a particle size is, the larger the speed of the movement of the silver particles is. The smaller a particle size is, the smaller the speed of the movement of the silver particles is. In the case where the silver particles having Brownian motion are irradiated with laser light, fluctuation of the scattering light is observed so as to correspond to the Brownian motion of the silver particles. This fluctuation is measured to obtain an autocorrelation function through a photon correlation method or the like, and a cumulant method, histogram analysis, or the like can be used to obtain the diameters of the silver particles and the frequency (number) of the silver particles corresponding to the diameters. The dynamic light scattering is suitable for a sample containing the silver particles of a submicron size, such as the aqueous ink composition of this embodiment, and employment of the dynamic light scattering enables the grain size accumulation curve to be obtained with relative ease. Examples of the particle size distribution analyzer based on the dynamic light scattering include Nanotrac UPA-EX150 (commercially available from NIKKISO CO., LTD.), ELSZ-2 and DLS-8000 (commercially available from Otsuka Electronics Co., Ltd.), and LB-550 (commercially available from HORIBA, Ltd.).

The silver particles are contained in an amount (solid content) that is preferably in the range from 0.1 weight % to 30 weight % with respect to the total weight of the aqueous ink composition, more preferably in the range from 1 weight % to 20 weight %, and particularly in the range from 5 weight % to 15 weight %. In the case where the silver particles content falls within such ranges, an image having metallic gloss can be recorded on a recording medium.

1. 1. 2. Method of Producing Silver Particles

Examples of a method of producing the silver particles include, but are not limited to, the following first to third methods. In the following methods, the silver colloidal particles are produced in the form of a colloidal liquid in which the silver colloidal particles are dispersed in an aqueous dispersion medium.

1. 1. 2a. First Method

The first method has the following processes: a first solution preparation process, in which a first solution at least containing a polymer of vinylpyrrolidone and polyhydric alcohol is prepared; a second solution preparation process, in which a second solution in which a silver precursor that can be reduced to silver (metal) is dissolved in a solvent is prepared; a first solution-heating process, in which the first solution is heated to a predetermined temperature; a mixing process, in which the heated first solution is mixed with the second solution to produce a mixed solution; a reaction progress process, in which the mixed solution is held at a predetermined temperature for a certain time period; and a dispersion process, in which the silver particles (silver colloidal particles) are retrieved from the mixed solution in which reaction has proceeded and are then dispersed in an aqueous dispersion medium.

First Solution Preparation Process

First, the first solution at least containing a polymer of vinylpyrrolidone and polyhydric alcohol is prepared.

In one of the functions of the polymer of vinylpyrrolidone which is contained in the first solution, such a polymer adsorbs onto surfaces of the silver particles that are produced by this exemplified production method, thereby preventing agglomeration of the silver particles with the result that silver colloidal particles are formed.

The polymer of pyrrolidone, which is herein used, may include a homopolymer (polyvinylpyrrolidone) of vinylpyrrolidone and may include a copolymer of vinylpyrrolidone.

Examples of the copolymer of vinylpyrrolidone include a copolymer of vinylpyrrolidone with α-olefin, a copolymer of vinylpyrrolidone with vinyl acetate, a copolymer of vinylpyrrolidone with dimethylaminoethyl(meth)acrylate, a copolymer of vinylpyrrolidone with (meth)acrylamidopropyltrimethylammonium chloride, a copolymer of vinylpyrrolidone with vinylcaprolactam dimethylaminoethyl(meth)acrylate, a copolymer of vinylpyrrolidone with styrene, and a copolymer of vinylpyrrolidone with (meth)acrylic acid.

In the case where polyvinylpyrrolidone is employed as the polymer of vinylpyrrolidone, the weight-average molecular weight of polyvinylpyrrolidone is preferably in the range from 3000 to 60000.

The polyhydric alcohol is a compound having a function to reduce the silver precursor contained in the second solution to silver (metal).

Examples of the polyhydric alcohol include ethylene glycol, propylene glycol, butylene glycol, diethylene glycol, triethylene glycol, tetraethylene glycol, dipropylene glycol, tripropylene glycol, 1,3-propanediol, 1,2-butanediol, 2,3-butanediol, 1,3-butanediol, 1,4-butanediol, glycerol, trimethylolpropane, pentaerythritol, triethanolamine, and trihydroxymethyl aminomethane.

The above polymer of vinylpyrrolidone is dissolved in the above polyhydric alcohol, thereby preparing the first solution.

In order to remove excessive moisture, impurity, or the like, the polymer of vinylpyrrolidone is preferably heated at a temperature that is in the range from 70° to 120° C. In this case, the heating is preferably continued for eight hours or longer.

Furthermore, in addition to the polyhydric alcohol, a reducing agent that serves to reduce the silver precursor contained in the second solution may be contained in the first solution.

Examples of the reducing agent include hydrazine and derivatives thereof; hydroxylamine and derivatives thereof; monohydric alcohol such as methanol or ethanol; aldehyde such as formaldehyde, formic acid, acetaldehyde, propionaldehyde, or ammonium salts thereof; hypophosphite; sulfite; tetrahydroborate (for example, tetrahydroborate of Li, Na, and K); lithium aluminum hydride (LiAlH$_4$); sodium borohydride (NaBH$_4$); polyhydroxybenzene such as hydroquinone, alkyl substituted hydroquinone, catechol, or pyrogallol; phenylenediamine and derivatives thereof; aminophenol and derivatives thereof; carboxylic acid and derivatives thereof such as ascorbic acid, citric acid, or ascorbic acid ketal; 3-pyrazolidone and derivatives thereof; hydroxytetronic acid, hydroxytetronic acid amide, and derivatives thereof; bis-naphthols and derivatives thereof; sulfonamidephenol and derivatives thereof; and Li, Na, and K. Among these, ammonium formate, formic acid, formaldehyde, acetaldehyde, propionaldehyde, ascorbic acid, citric acid, sodium borohydride, lithium aluminum hydride, and lithium triethylborohydride are preferably employed, and ammonium formate is more preferably employed.

Second Solution Preparation Process

Next, the second solution in which the silver precursor that can be reduced to silver is dissolved in a solvent is prepared.

The silver precursor is a compound which can be reduced by using the above polyhydric alcohol or reducing agent to produce the silver (metal).

Examples of such a silver precursor include inorganic acid salts and organic acid salts of silver, such as oxide, hydroxide (including hydrated oxides), nitrate, nitrite, sulfate, halide (for example, fluoride, chloride, bromide, and iodide), carbonate, phosphate, azide, borate, (including fluoroborate, pyrazolyl borate, and the like), sulfonate, carboxylate (for example, formate, acetate, propionate, oxalate, and citrate), substituted carboxylate (including halogenated carboxylate such as trifluoroacetate, hydroxycarboxylate, aminocarboxylate, or the like), hexachloroplatinate, tetrachloroaurate, and tungstate of silver; silver alkoxide; and silver complex.

Any solvent in which the above silver precursors can be dissolved may be employed. Examples of such a solvent to be used include the polyhydric alcohol described in the first solution preparation process; aliphatic, alicyclic, and aromatic alcohols (the term "alcohol" is herein simply used to refer to "monohydric alcohol"); ether alcohols; and amino alcohols.

The above silver precursors are dissolved in a solvent, thereby producing the second solvent.

Mixing Process

Subsequently, the first solution is mixed with the second solution, thereby producing a mixed solution.

In this case, the first solution has a temperature that is preferably in the range from 100° C. to 140° C., more preferably in the range from 101° C. to 130° C., further preferably in the range from 115° C. to 125° C. Accordingly, the silver precursor contained in the second solution can be more efficiently reduced, and vinylpyrrolidone can be more efficiently adsorbed onto surfaces of the silver particles to be produced.

Reaction Progress Process

Subsequently, the mixed solution which has been produced as a result of mixing the first solution with the second solution is heated at a predetermined temperature for a certain time period, thereby promoting the reduction reaction of the silver precursor.

In this case, a heating temperature is preferably in the range from 100° C. to 140° C., more preferably in the range from 101° C. to 130° C., further preferably in the range from 115° C. to 125° C. Accordingly, the silver precursor can be more efficiently reduced, and vinylpyrrolidone can be more efficiently adsorbed onto surfaces of the silver particles to be produced.

Although heating time (reaction time) depends on the heating temperature, the heating time is preferably in the range from 30 minutes to 180 minutes, more preferably in the range from 30 minutes to 120 minutes, further preferably in the range from 60 minutes to 120 minutes. Accordingly, the silver precursor can be more steadily reduced, and vinylpyrrolidone can be more effectively adsorbed onto surfaces of the silver particles to be produced.

Dispersion Process

Subsequently, if needed, the produced silver particles (silver colloidal particles) are separated through filtration, centrifugal separation, or the like, and the separated silver particles are dispersed in an aqueous dispersion medium at a predetermined concentration. Through these processes, the silver particles, the aqueous ink composition, or an aqueous dispersion of colloidal silver can be produced.

1. 1. 2b. Second Method

In the second method, an aqueous solution is first prepared, in which a dispersant and a reducing agent are dissolved. Although the dispersant is not specifically limited, the dispersant contains hydroxy acid or salts thereof which have a total of three or more COOH groups and OH groups and in which the number of the COOH groups is identical to or larger than that of the OH groups. In one of the functions of the dispersant, the dispersant adsorbs onto surfaces of the silver particles to form colloidal particles, and the electrical repulsion of the COOH groups of the dispersant serves to uniformly disperse the silver colloidal particles in an aqueous solution, thereby stabilizing a colloidal liquid. The addition of the dispersant enables the silver colloidal particles to be stably contained in the dispersion medium, and, for example, dispersibility can be therefore further improved.

Examples of such a dispersant include citric acid, malic acid, trisodium citrate, tripotassium citrate, trilithium citrate, triammonium citrate, disodium malate, tannic acid, gallotannic acid, and gall tannin. These are used alone or in combination of two or more.

In addition, the dispersant may contain mercapto acid or salts thereof having a total of two or more COOH groups and SH groups. In such a dispersant, because the ability of a mercapto group to adsorb onto surfaces of the silver particles may be identical to or greater than that of a hydroxyl group, the colloidal particles can be further easily formed. Therefore, a function may be enhanced, in which the electrical repulsion of the COOH groups of the dispersant serves to uniformly disperse the silver colloidal particles in an aqueous solution with the result that the colloidal liquid is stabilized. Examples of such a dispersant include mercaptoacetic acid, mercaptopropionic acid, thiodipropionic acid, mercaptosuccinic acid, thioacetic acid, sodium mercaptoacetate, sodium mercaptopropionate, sodium thiodipropionate, disodium mercaptosuccinate, potassium mercaptoacate, potassium mercaptopropionate, potassium thiodipropionate, and dipotassium mercaptosuccinate. These are used alone or in combination of two or more.

The dispersant is preferably contained in an amount in which the molar ratio of silver to the dispersant approximately falls within a range from 1:1 to 1:100, the silver being contained in a silver salt, such as silver nitrate, as a starting material. In the case where the molar ratio of the dispersant to the silver salt is increased, the sizes of the silver particles are decreased, thereby being able to further improve dispersibility.

In one of the functions of the reducing agent, $Ag^+$ ions in the silver salt, such as silver nitrate ($Ag^+NO_3^-$), as a starting material are reduced to produce the silver particles.

Examples of the reducing agent include, but are not limited to, an amine-based reducing agent such as hydrazine, dimethylaminoethanol, methyldiethanolamine or triethanolamine; a hydrogen compound-based reducing agent such as sodium boron hydroxide, hydrogen gas, or hydrogen iodide; an oxide-based reducing agent such as carbon monoxide, sulfurous acid, or hypophosphorous acid; a low-valent metal salt-based reducing agent such as an Fe (II) compound or an Sn (II) compound; an organic compound-based reducing agent (for example, formaldehyde or sugar such as D-glucose); hydroxy acid such as citric acid or malic acid; a hydroxy acid salt such as trisodium citrate, tripotassium citrate, trilithium citrate, triammonium citrate, or disodium malate; and tannic acid. Among these, the tannic acid and the hydroxy acid serve as both the reducing agent and the dispersant and can be therefore preferably employed. Furthermore, the mercapto acid and salts thereof can be preferably employed as the reducing agent, each being described above as a dispersant that forms a stable bond onto a surface of the silver. Examples of the reducing agent include mercapto acid such as mercaptoacetic acid, mercaptopropionic acid, thiodipropionic acid, mercaptosuccinic acid, or thioacetic acid; and a mercapto acid salt such as sodium mercaptoacetate, sodium mercaptopropionate, sodium thiodipropionate, sodium mercaptosuccinate, potassium mercaptoacate, potassium mercaptopropionate, potassium thiodipropionate, or potassium mercaptosuccinate.

These reducing agents and dispersants may be used alone or in combination of two or more. In the case of using these reducing agents and dispersants, light or heat may be applied thereto to promote the reduction reaction.

Although the reducing agent is sufficiently contained in an amount in which the silver salt as the starting material can be completely reduced, the reducing agent contained in an excessive amount may remain as impurity in the silver colloidal liquid with the result that a problem may be caused, in which the conductivity of a formed film is deteriorated, for example. Therefore, the content of the reducing agent is preferably minimized as much as possible. Specifically, the reducing agent is preferably contained in an amount in which the molar ratio of the silver salt to the reducing agent falls within a range approximately from 1:1 to 1:3.

In this exemplified production method, the dispersant and the reducing agent are dissolved to prepare an aqueous solution, and then the potential Hydrogen (pH) level of the aqueous solution is preferably adjusted in the range from 6 to 12. This pH adjustment is employed for the following reason. For example, in the case where trisodium citrate as the dispersant and ferrous sulfate as the reducing agent are mixed, depending on the total concentration, a pH level is in the range approximately from four to five and falls below the above level that is six. In this case, equilibrium of a reaction represented by the following reaction formula (1) is shifted to the right side owing to the presence of hydrogen ions in the aqueous solution, thereby increasing a quantity of the COOH groups.

  (1)

Therefore, the electrical repulsion of the surfaces of the silver particles that are subsequently obtained by delivering a silver salt solution by drops into the aqueous solution is decreased, resulting in decrease of the dispersibility of the silver particles (colloidal particles).

Accordingly, after the aqueous solution is prepared as a result of dissolving the dispersant and the reducing agent, an alkaline compound is added to the aqueous solution with the result that the concentration of hydrogen ions is decreased, thereby being able to suppress such decrease of the dispersibility.

Examples of the alkaline compound to be added include, but are not limited to, sodium hydroxide, potassium hydroxide, lithium hydroxide, ammonia water, and the above alkanolamine. Among these, in the case where alkanolamine is used, the pH level can be easily adjusted, and the dispersibility of the silver colloidal particles to be formed can be further improved.

In the case where the alkaline compound is added in an excessive amount with the result that the pH level exceeds 12, hydroxide of ions, such as ferrous ions, of the reducing agent that remains is easily precipitated. Therefore, such addition in an excessive amount is not preferable.

Next, in this exemplified production example, an aqueous solution containing a silver salt is delivered by drops into the prepared aqueous solution in which the dispersant and the reducing agent are dissolved. Examples of the silver salt include, but are not limited to, silver acetate, silver carbonate, silver oxide, silver sulfate, silver nitrite, silver chlorate, silver sulfide, silver chromate, silver nitrate, and silver dichromate. Among these, silver nitrate exhibiting high solubility with respect to water is preferably employed.

Furthermore, the amount of the silver salt is determined in view of an intended content of the colloidal particles and an intended ratio of the reduction due to the reducing agent. For example, in the case of using silver nitrate, such an amount is preferably determined as the range approximately from 15 parts by weight to 70 parts by weight with respect to the aqueous solution of 100 parts by weight.

The aqueous solution of the silver salt is prepared by dissolving the above silver salt in purified water. Then, the aqueous solution of the silver salt is gradually delivered by drops into the aqueous solution in which the dispersant and reducing agent described above are dissolved. In this process, the silver salt is reduced to the silver particles owing to the reducing agent, and the dispersant adsorbs onto surfaces of the silver particles so as to form silver colloidal particles. Accordingly, an aqueous solution in which the silver colloidal particles are dispersed can be produced.

The resultant solution contains residues of the reducing agent and the dispersant in addition to the colloidal particles, and the ion concentration is therefore overall increased in the resultant solution. In general, in the liquid in such a state, coagulation occurs, and precipitation is easily generated. Therefore, in order to remove extra ions in the aqueous solution with the result that the ion concentration is decreased, washing is preferably performed.

For example, a method to be employed for the washing may include the following processes that are repeated several times: the produced aqueous solution containing the colloidal particles is allowed to stand for a certain period; a supernatant solution is generated in the aqueous solution and is then removed; purified water is added to the resultant solution and is then stirred again; the resultant solution is further allowed to stand for a certain period; and a newly generated supernatant solution is removed. In addition, other examples of the method to be employed include a method in which centrifugal separation is employed in place of leaving the aqueous solution to stand and include a method in which ions are removed through ultrafiltration or the like.

Alternatively, the following method may be employed for the washing. After the solution is produced, the pH level of the solution is adjusted so as to fall within an acid range that is five or lower, the electrical repulsion of the surfaces of the silver particles is decreased as a result of shifting the equilibrium of the reaction, which is represented by the reaction formula (1), to the right side of the formula, and the washing is performed in a state in which the silver colloidal particles are actively agglomerated. Accordingly, a salt and a solvent can be removed. In the case of using the silver colloidal particles that have a sulfuric compound having a low molecular weight, such as mercapto acid, on their surface as the dispersant, a stable bond is formed on a surface of metal. Therefore, the pH level of the solution is adjusted again so as to fall within an alkaline range that is six or higher, so that the agglomerated silver colloidal particles are easily redispersed, thereby being able to produce the metal colloidal liquid exhibiting excellent dispersion stability.

In this exemplified production method, after the above process, if needed, an aqueous solution of an alkali metal hydroxide is preferably added to the aqueous solution in which the silver colloidal particles are dispersed, thereby finally adjusting the pH level to the range from 6 to 11. Because the washing is performed after the reduction in this exemplified example, the concentration of sodium that serves as an electrolyte ion may be decreased. In the solution in such a state, the equilibrium of the reaction represented by the following reaction formula (2) shifts to the right side of the formula.

$$-COO^-Na^+ + H_2O \leftarrow \rightarrow -COOH + Na^+ + OH^- \quad (2)$$

In such a state, the electrical repulsion of the silver colloid is decreased with the result that the dispersibility of the silver particles may be decreased. Therefore, an alkali hydroxide is added an appropriate amount, so that the equilibrium of the reaction represented by the reaction formula (2) is shifted to the left side of the formula, thereby stabilizing the silver colloid.

Examples of the alkali metal hydroxide that is used in this case include the same compound as employed in the case where the pH level is first adjusted. In the case where the pH level is less than six, the equilibrium of the reaction represented by the reaction formula (2) shifts to the right side of the formula, and the colloidal particles therefore become unstable. On the other hand, in the case where the pH level exceeds 11, a hydroxide salt of remaining ions such as a metal ion comes to easily precipitate, resulting in an unfavorable situation. However, if the metal ion is removed in advance, the pH level exceeding 11 does not provide significantly harmful effect.

Cations such as sodium ions are preferably added in the form of a hydroxide. This is because autoprotolysis of water can be utilized with the result that the cations such as sodium ions can be most effectively added to the solution. Furthermore, in the above process of adjusting the pH level to the range from 6 to 11, alkanolamine may be used in place of the aqueous solution of an alkali metal hydroxide.

1. 1. 2c. Third Method

A third method has the following processes: a process of preparing an aqueous solution of an oxidized polymer, in which an oxidized polymer solution in which an oxidized polymer of a phenolic compound is dissolved in a solvent is prepared; a process of preparing a silver compound solution, in which the silver compound solution in which a silver compound is dissolved is prepared; and a mixing and reducing process, in which the aqueous solution of the oxidized polymer is mixed with the silver compound solution, and the silver compound is reduced, thereby producing fine silver particles.

Process of Preparing Oxidized Polymer Solution

In this process, an oxidized polymer solution is prepared, in which an oxidative polymer of a phenolic compound is dissolved in a solvent.

The oxidized polymer of a phenolic compound has reducing power and can serve to reduce a silver compound that will be hereinafter described. Furthermore, an oxidized product or an excessive product is generated through the reduction reaction or the like of the oxidized polymer of the phenolic compound, and such a product can coordinate or adsorb onto surfaces of the produced fine silver particles. Accordingly, the silver colloidal solution in which the silver colloidal particles are dispersed can be produced.

As the oxidized polymer of the phenolic compound, fused polycarbocyclic compound can be employed, which is produced as a result of polymerization in which two or more molecules are bonded while part of the phenolic compound is oxidized.

Specifically, at last one of the following compounds (1) to (4) is preferably used, such as: (1) dihydroxy-dibenzofuran-dione and derivatives thereof in which the substitution positions of a hydroxyl group are two positions selected from first to fourth sites and in which the substitution positions of a carbonyl group are two positions selected from fifth to eighth sites, such as 1,2-dihydroxy-dibenzofuran-7,8-dione, 2,4-dihydroxy-dibenzofuran-5,7-dione, and 1,2-dihydroxy-4,5-dicarboxy-dibenzofuran-7,8-dione; (2) tetrahydroxy-5H-benzo[7]annulen-5-one and derivatives thereof in which the substitution positions of a hydroxyl group are two positions selected from first to third sites, a fourth site, and one position selected from sixth and seventh sites, such as 2,3,4,6-tetrahydroxy-5H-benzo[7]annulen-5-one (purpurogallin in general name); (3) a compound that is produced as a result of further oxidatively polymerizing the above (1) or (2) compound; and (4) a compound that is produced as a result of oxidatively polymerizing at least one compound selected from the above (1) to (3) compounds with at least one compound selected from dihydric and trihydric phenolic compounds and derivatives thereof. In this case, the derivatives refer to compounds that are generated as a result of change in small portions of the molecules of the oxidized polymer. Examples of such compounds include compounds in which a hydrogen atom of the oxidized polymer is substituted with an alkyl group, halogen atom, hydroxyl group, carboxyl group, or the like.

The oxidized polymer of a phenolic compound can be produced as a result of oxidizing the phenolic compound by using an oxidant, and the degree of the polymerization can be controlled depending on the additive amount of the oxidant, oxidation reaction time, or the like. Specifically, such an oxidized polymer can be produced through mixing the phenolic compound with the oxidant or can be produced through dissolving the phenolic compound in an aqueous solvent, an organic solvent such as alcohol, or a mixed solvent of the aqueous solvent and the organic solvent such as alcohol and then mixing the resultant solution with the oxidant.

Examples of the oxidant to be used include oxidized gas such as air or oxygen and include a compound such as hydrogen peroxide, permanganic acid, potassium permanganate, or sodium iodate. Especially, in terms of an economic advantage, air is preferably employed.

In the case where oxidized gas is used as the oxidant, a solution (phenolic compound solution) in which the phenolic compound is dissolved in a solvent may be mixed with the oxidized gas such as air by stirring the solution in an open system or by bubbling the oxidized gas such as air through the solution.

As in the case of a solution of a metallic compound that will be hereinafter described, an aqueous solvent is preferably employed as the solvent in terms of easy handling and an economic advantage. In the case where the phenolic compound is oxidized, the color of the transparent solution turns to reddish brown, dark brown, blackish brown, or the like, and progression of polymerization makes the color turn to more brownish. Therefore, production of the oxidized polymer can be visually recognized. In the case where the phenolic compound solution is adjusted so as to have a pH level greater than or equal to six, polymerization easily proceeds, and such a pH level is therefore preferably employed. More preferably, a pH level that is in the range from 6 to 13 is employed, further preferably in the range from 8 to 11.

Preferably, a product that is produced as a result of oxidatively polymerizing a dihydric or trihydric phenolic compound or derivatives thereof in the above conditions is employed as the oxidized polymer. Examples of the dihydric phenolic compound include hydroquinone, catechol, and resorcinol. Examples of the trihydric phenolic compound include pyrogallol, phloroglucinol, and 1,2,4-trihydroxybenzene. Examples of the derivatives include gallic acid that is a derivative of pyrogallol. These compounds may be used alone or in combination of two or more. In the above compounds, a compound having three hydroxyl groups is preferably employed, and pyrogallol, phloroglucinol, and 1,2,4-trihydroxybenzene are more preferably employed.

Specific examples of the oxidized polymer of pyrogallol include a fused polycarbocyclic compound such as 1,2-dihydroxy-dibenzofuran-7,8-dione or purpurogallin(2,3,4,6-tetrahydroxy-5H-benzo[7]annulen-5-one). Examples of the oxidized polymer of phloroglucinol include a fused polycarbocyclic compound such as 2,4-dihydroxy-dibenzofuran-5,7-dione. Examples of the oxidized polymer of 1,2,4-trihydroxybenzene include a fused polycarbocyclic compound such as 1,3-dihydroxy-dibenzofuran-6,8-dione or 1,3,4,7-tetrahydroxy-5H-benzo[7]annulen-5-one.

Examples of derivatives of the dihydric or trihydric phenolic compound include a fused polycarbocyclic compound such as 1,2-dihydroxy-4,5-dicarboxy-dibenzofuran-7,8-dione that is the oxidized polymer of gallic acid.

The following products may be produced to be used, such as: a product that is produced as a result of further oxidatively polymerizing the above polycyclic compounds; a product that is produced as a result of oxidatively polymerizing the above polycyclic compounds or oxidized polymer thereof with at least one compound selected from the dihydric and trihydric phenolic compounds and derivatives thereof; and derivatives thereof.

Process of Preparing Silver Compound Solution

The silver compound solution in which a silver compound is dissolved is prepared.

The silver compound is a compound that is reduced to silver (metal) and is used as a material for producing silver particles.

Examples of the silver compound to be used include chloride, sulfate, nitrate, carbonate, and acetate of silver. As a solvent in which the silver compound is dissolved, water, an organic compound such as alcohol, or a mixture of the water and the organic compound such as alcohol can be used, and water is preferably employed as the solvent in terms of easy handling and an economic advantage. The concentration of the silver compound in the solvent is not specifically limited as long as the silver compound is dissolved, and the concentration is preferably designed as 5 mmol/L or higher in terms of an industrial viewpoint.

Mixing and Reducing Process

Subsequently, the above solution of the oxidized polymer is mixed with the silver compound solution through stirring, and the silver compound is reduced, thereby producing the silver particles.

Although the amount used of the oxidized polymer is not specifically limited, the oxidized polymer is used in an amount that is in the range from 0.1 to 10 in the molar ratio to the silver compound on the basis of the phenolic compound alone, more preferably in the range from 0.2 to 5.

Although reduction temperature can be appropriately determined, reduction is conducted at a temperature that is preferably in the range from 5° C. to 105° C., more preferably in the range from 10° C. to 80° C.

Meanwhile, in the above reduction reaction, another reducing agent, for example alcohols or amines, may be supplementarily added. The silver particles can be produced in this manner. An excess component and an inadequate ionic component can be removed through dialysis, solid-liquid separation, and washing, where appropriate. Furthermore, drying or the like can be performed, where appropriate.

In the silver particles that are produced through the above reduction reaction, at least one of an oxidized polymer of the above phenolic compound and an oxidant of such an oxidized polymer exists on surfaces of the silver particles, thereby forming silver colloidal particles. Accordingly, for example, the silver colloidal particles are dispersed in water, so that a silver colloidal liquid can be easily produced.

1. 2. Humectant

The aqueous ink composition of this embodiment contains a humectant. As the humectant, the aqueous ink composition of this embodiment contains at least one member selected from glycerols, glycols, and saccharide. Because such a humectant is contained, an image having excellent metallic gloss can be recorded in the case where printing is performed onto a recording medium. In addition, an advantage is provided, in which the aqueous ink composition is prevented from drying with the result that clogging is prevented in an ink jet recording head.

Examples of glycelols include glycerin, diglycerin, triglycerin, trimethylolethane, trimethylolpropane, C1 to C10 alkyl glyceryl ether, C1 to C10 alkyl diglyceryl ether, and C1 to C10 alkyl triglyceryl ether. Among these glycerols, glycerin and trimethylolpropane can be preferably employed to further improve the metallic gloss of an image.

Examples of glycols include ethylene glycol, diethylene glycol, triethylene glycol, tetraethylene glycol, pentaethylene glycol, propylene glycol, dipropylene glycol, tripropylene glycol, butylene glycol, 1,2-pentanediol, 1,2-hexanediol, 1,2-heptanediol, 1,2-octanediol, 1,2,6-hexanetriol, thioglycol, hexylene glycol, and polyethylene glycol. Among these glycols, triethylene glycol, hexylene glycol, propylene glycol, and polyethylene glycol are preferably employed to further improve the metallic gloss of an image.

Examples of saccharide include monosaccharides such as glucose, fructose, and galactose; disaccharides such as maltose, sucrose, cellobiose, lactose, trehalose, isomaltose, and gentiobiose; trisaccharides such as gentianose, raffinose, and panose; other polysaccharides; and sugar alcohol. As the saccharide, reduced starch saccharide (mixture containing sugar alcohol) such as HS-500 (commercially available product from HAYASHIBARA SHOJI, INC.) may be used.

The above examples of the humectant may be used alone or in combination of two or more.

The humectant is contained in an amount that is preferably in the range from 5 weight % to 20 weight % with respect to the total weight of the aqueous ink composition, more preferably in the range from 10 weight % to 15 weight %. In the case where the content of the humectant falls within such ranges, an image having excellent metallic gloss can be recorded when printing is performed onto a recording medium. In the case where the content of the humectant falls below the above ranges, the metallic gloss of an image is likely to be decreased. In the case where the content of the humectant exceeds the above ranges, the metallic gloss of an image is also likely to be decreased.

As described above, in the aqueous ink composition containing the silver particles, the types or content of the humectant is appropriately adjusted, thereby being able to control the metallic gloss of an image printed on a recording medium. On the basis of such a technical idea, a set of aqueous ink compositions containing silver particles can be produced, which can individually provide the different metallic gloss of an image printed on a recording medium.

1. 3. Water

The aqueous ink composition of this embodiment contains water. Examples of the water include, but are not limited to, purified water such as ion exchanged water, ultrafiltered water, reverse osmosis water, or distilled water and ultrapure water. Water may contain ions or the like as long as the dispersion of the silver particles is not prevented.

1. 4. Other Additives

The aqueous ink composition of this embodiment may appropriately contain an additive such as a surfactant, preservative, pH adjuster, or colorant.

Examples of the surfactant include an acetylene glycol surfactant and a polysiloxane surfactant. These surfactants have advantages in which wettability to a recording surface and ink permeability are improved. Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. A commercially available product can be used as the acetylene glycol surfactant, and examples of such a commercially available product include OLFINEs (registered trademark) E1010, STG, and Y (these are commercially available from Nissin Chemical Industry CO., Ltd.) and include SUR-FYNOLs 104, 82, 465, 485, and TG (these are commercially available from Air Products and Chemicals, Inc.). A commercially available product can be used as the polysiloxane surfactant, and examples of such a commercially available product include BYK-347 and BYK-348 (commercially available from BYK Japan KK). Furthermore, the aqueous ink composition of this embodiment may contain another surfactant such as an anionic surfactant, nonion surfactant, or ampholytic surfactant.

The surfactant is contained in an amount that is preferably in the range from 0.01 weight % to 5 weight % with respect to the total weight of the aqueous ink composition, more preferably in the range from 0.1 weight % to 1 weight %.

Examples of the preservative include sodium benzoate, sodium pentachlorophenolate, 2-pyridinethiol-1-oxide sodium, sodium sorbate, sodium dehydroacetate, and 1,2-dibenzothiazolin-3-one [Proxel (registered trademark) CRL, Proxel BND, Proxel GXL, Proxel XL-2, and Proxel TN, each being commercially available from ICI Americas Inc.].

The preservative is contained in an amount that is preferably in the range from 0.1 weight % to 2 weight % with respect to the total weight of the aqueous ink composition, more preferably in the range from 0.2 weight % to 1 weight %.

Examples of the pH adjuster include amines such as diethanolamine, triethanolamine, propanolamine, and morpholine and modifications thereof; inorganic salts such as potassium hydroxide, sodium hydroxide, and lithium hydroxide; ammonium hydroxide; and quaternary ammonium hydroxide (such as tetramethylammonium).

Examples of the colorant include pigment and dye. A colorant that can be generally used for ink can be employed. The colorant which can be added to the aqueous ink composition of this embodiment may have any of chromatic color and achromatic color. In the case where the colorant is contained in the aqueous ink composition, glossy color as well as metallic gloss can be imparted to an image to be recorded onto a recording medium, for example.

1. 5. Application and Properties of Aqueous Ink Composition

Application of the aqueous ink composition of this embodiment is not specifically limited, and the aqueous ink composition can be applied to writing materials, stamps, recorders, pen plotters, ink jet recording apparatuses, or the like.

For example, in the case where the aqueous ink composition is applied to printing by an ink jet recording technique, the aqueous ink composition at a temperature of 20° C. has a viscosity that is preferably in the range from 2 mPa·s to 10 mPa·s, more preferably in the range from 3 mPa·s to 5 mPa·s. In the case where the aqueous ink composition at a temperature of 20° C. has a viscosity that falls within such ranges, the aqueous ink composition is ejected from a nozzle in an appropriate amount, and flight bending and splashing of the aqueous ink composition can be further suppressed. Therefore, the aqueous ink composition can be desirably applied to an ink jet recording apparatus. The aqueous ink composition at a temperature of 20° C. exhibits a surface tension that is generally in the range from 0.2 mN/cm to 0.7 mN/cm, preferably in the range from 0.25 mN/cm to 0.6 mN/cm, and more preferably in the range from 0.3 mN/cm to 0.4 mN/cm. The viscosity and the surface tension of the aqueous ink composition can be adjusted as a result of appropriately changing the additive amounts of the above components.

2. Recorded Article

In a recorded article of an embodiment of the invention, the above aqueous ink composition is used to record an image onto a recording medium. The aqueous ink composition of this embodiment contains the silver particles and the humectant as described above. Therefore, the image that is recorded using such an aqueous ink composition has excellent metallic gloss.

Any of glossy, matte, and dull materials may be used as the recording medium. Specific examples of the recording medium include treated paper such as coated paper, art paper, or cast-coated paper and include a plastic film such as a polyvinyl chloride sheet or a polyethylene terephthalate (PET) film each having an ink-receiving layer.

The gloss of an image that is recorded on the recording medium by using the aqueous ink composition of this embodiment can be evaluated in accordance with a "specular gloss-measurement method" that is defined in Japanese Industrial Standards (JIS) Z8741 (1997). For example, light is emitted to an image-recorded plane at incident angles of 20°, 45°, 60°, 75°, and 85°, photodetectors are placed in directions of individual reflection angles of the light to measure light intensity, and the gloss can be calculated on the basis of the measurement results. Examples of an apparatus that is used in such measurement include "MULTI GLOSS 268" commercially available from KONICA MINOLTA HOLDINGS, INC. and "GlossMeter type-VGP5000" commercially available from NIPPON DENSHOKU INDUSTRIES CO., LTD.

In the above process of evaluating the gloss, for example, it is preferable that a gloss at an angle of 20° has a maximum that is 700 or larger, more preferably 800 or larger, particularly 900 or larger.

3. Examples

Although examples will be provided to describe embodiments of the invention in more detail, embodiments of the invention are not limited to the examples at all.

3. 1. Preparation of Aqueous Ink Composition

Silver particles, a humectant, a surfactant, a preservative, and ion-exchanged water were mixed in amounts illustrated in Table 1 and were then stirred. The resultant product was filtrated through a metallic filter having a pore diameter of 5 μm and was then degased with a vacuum pump, thereby individually producing ink compositions of examples 1 to 16 and a comparison example 1. Meanwhile, in Table 1, concentration of each of the examples 1 to 16 and comparison example 1 is illustrated on the basis of a unit of weight %. The concentration of the silver particles is illustrated by being converted to a unit of solid content concentration.

A commercially available product "CSD-29" (from Cabot Corporation) was employed as the silver particles. The CSD-29 is slurry containing the silver particles in a ratio of solid content concentration of 20%.

A particle size distribution analyzer (type "Nanotrac UPA-EX-150" commercially available from NIKKISO CO., LTD.) having a measurement principle of dynamic light scattering was used to obtain the average primary particle size and particle sizes d10 and d90 of the silver particles contained in the resultant ink compositions. Then, in each of the ink compositions, the silver particles had an average primary particle size of 20 nm, a particle size d10 of 10 nm, and a particle size d90 of 80 nm.

Details of the components illustrated in Table 1 were as follows:
Glycerin (product name "DG Glycerin" commercially available from Adeka Clean Aid CO., Ltd.);
Trimethylolpropane (product name, commercially available from MITSUBISHI GAS CHEMICAL COMPANY, INC.);
Triethylene glycol (product name, commercially available from MITSUBISHI GAS CHEMICAL COMPANY, INC.);
Hexylene glycol (product name, commercially available from TOKYO CHEMICAL INDUSTRY CO., LTD.);
Reduced starch saccharide (mixture containing sugar alcohol, product name "HS-500" commercially available from HAYASHIBARA SHOJI, INC.);
Propylene glycol (product name, commercially available from KANTO CHEMICAL CO., INC.);
Polyethylene glycol (product name "PEG1000" commercially available from NOF CORPORATION);
Surfactant (product name "OLFINE E1010" commercially available from Nissin Chemical Industry CO., Ltd.); and
Preservative (product name "Proxel XL2" commercially from Avecia).

3. 2. Production of Evaluation Samples

The aqueous ink compositions containing the silver particles and illustrated in Table 1 were individually fed into black ink chambers of ink cartridges specialized for ink jet printers (product name "PX-G930" commercially available from SEIKO EPSON CORPORATION). The ink cartridges produced in this manner were attached to the printers. As for ink cartridges other than black, commercially available products were attached to the printers. Such ink cartridges were used as dummies and were not used for the evaluation in these examples. Therefore, such ink cartridges did not have any influences on effects.

Subsequently, printing was performed to glossy photo paper (commercially available from SEIKO EPSON CORPORATION) in a resolution of 1440×720 dpi. A printing pattern was a solid pattern of 100% duty. In this case, the term "duty" refers to a value obtained from the following formula.

$$\text{duty (\%)} = \text{number of actually printed dots}/(\text{longitudinal resolution} \times \text{lateral resolution}) \times 100$$

(in the formula, the term "number of actually printed dots" refers to number of actually printed dots per unit area, the terms "longitudinal resolution" and "lateral resolution" each refer to resolution per unit area, and the term "100% duty" refers to a maximum ink weight of a single color with respect to a pixel).

3. 3. Method of Evaluating Gloss

The gloss of the samples produced in the part titled "3. 2. Production of Evaluation Samples" was evaluated. The gloss at incident angles of 20° and 60° was measured by using "MULTI GLOSS 268 type gloss meter" (commercially available from KONICA MINOLTA HOLDINGS, INC.). Table 1 illustrates the measurement results and evaluation results at the incident angles of 20° and 60°. Evaluation criteria were employed as follows.

A: the maximum of the gloss at an incident angle of 20° was greater than or equal to 900,
B: the maximum of the gloss at an incident angle of 20° was 800 or larger and less than 900,
C: the maximum of the gloss at an incident angle of 20° was 700 or larger and less than 800, and
D: the maximum of the gloss at an incident angle of 20° was less than 700.

TABLE 1

|  |  | Example | | | | | | | | |
|---|---|---|---|---|---|---|---|---|---|---|
|  |  | 1 | 2 | 3 | 4 | 5 | 6 | 7 | 8 | 9 |
| Humectant | Glycerin | 20 | | | | | | | | |
|  | Trimethylolpropane | | 5 | 10 | 15 | 20 | | | | |
|  | Triethylene glycol | | | | | | 5 | 10 | 20 | |
|  | Hexylene glycol | | | | | | | | | 5 |
|  | Reduced starch saccharide | | | | | | | | | |

TABLE 1-continued

|  |  |  |  |  |  |  |  |  |  |
|---|---|---|---|---|---|---|---|---|---|
| Propylene glycol | | | | | | | | | |
| Polyethylene glycol | | | | | | | | | |
| Silver particle (solid content concentration) | 10 | 10 | 10 | 10 | 10 | 10 | 10 | 10 | 10 |
| Surfactant | 0.6 | 0.6 | 0.6 | 0.6 | 0.6 | 0.6 | 0.6 | 0.6 | 0.6 |
| Preservative | 0.5 | 0.5 | 0.5 | 0.5 | 0.5 | 0.5 | 0.5 | 0.5 | 0.5 |
| Water | balance | balance | balance | balance | balance | balance | balance | balance | balance |
| Gloss maximum (incident angle of 20° C.) | 785 | 852 | 929 | 894 | 864 | 883 | 985 | 811 | 862 |
| Gloss maximum (incident angle of 60° C.) | 538 | 531 | 535 | 531 | 535 | 538 | 566 | 552 | 538 |
| Evaluation result | C | B | A | B | B | B | A | B | B |

|  |  | Example | | | | | | | Comparison example |
|---|---|---|---|---|---|---|---|---|---|
|  |  | 10 | 11 | 12 | 13 | 14 | 15 | 16 | 1 |
| Humectant | Glycerin | | | | | | | | |
|  | Trimethylolpropane | | | | | | | | |
|  | Triethylene glycol | | | | | | | | |
|  | Hexylene glycol | 10 | 15 | 20 | | | | | |
|  | Reduced starch saccharide | | | | 10 | 20 | | | |
|  | Propylene glycol | | | | | | 10 | | |
|  | Polyethylene glycol | | | | | | | 20 | |
| Silver particle (solid content concentration) | | 10 | 10 | 10 | 10 | 10 | 10 | 10 | 10 |
| Surfactant | | 0.6 | 0.6 | 0.6 | 0.6 | 0.6 | 0.6 | 0.6 | 0.6 |
| Preservative | | 0.5 | 0.5 | 0.5 | 0.5 | 0.5 | 0.5 | 0.5 | 0.5 |
| Water | | balance | balance | balance | balance | balance | balance | balance | balance |
| Gloss maximum (incident angle of 20° C.) | | 936 | 938 | 722 | 966 | 844 | 934 | 727 | 496 |
| Gloss maximum (incident angle of 60° C.) | | 551 | 545 | 534 | 554 | 540 | 538 | 523 | 462 |
| Evaluation result | | A | A | C | A | B | A | C | D |

3. 4. Evaluation Results

With reference to Table 1, it was found that the maximums of the gloss at an angle of 20° were significantly increased in the samples using the aqueous ink compositions of the examples 1 to 16 relative to that of the sample using the aqueous ink composition of the comparison example 1 which did not contain the humectant.

It was found that change of the types of the humectant enabled the maximum of the gloss at an angle of 20° to be changed if the humectants had the same concentration. It was found that especially excellent gloss was provided in the case where trimethylolpropane, triethylene glycol, hexylene glycol, sugar alcohol, and propylene glycol were used as the humectant.

It was found that change of the concentration of the humectant enabled the maximum of the gloss at an angle of 20° to be changed if the same type of humectant was employed. In the case where trimethylolpropane, triethylene glycol, hexylene glycol, sugar alcohol, and propylene glycol were used as the humectant, it was found that the concentration was optimum in the range from 10 weight % to 15 weight %.

Embodiments of the invention are not limited to the above embodiment and can be variously modified. For example, embodiments of the invention include configurations substantially the same as those described in the above embodiments (for example, configurations having the same functions, processes, and results or having the same objects and advantageous effects as those in the above embodiments). In addition, embodiments of the invention may include configurations provided by changing non-essential parts of the configurations described in the above embodiments. Furthermore, embodiments of the invention may include configurations that can provide effects the same as those described in the above embodiments or that can provide advantages the same as those described in the above embodiments. Still furthermore, embodiments of the invention may include configurations in which a well-known technique is added to the configurations described in the above embodiments.

What is claimed is:

1. An aqueous ink composition for recording image comprising:
    components at least including water, a silver particle, and a humectant; wherein:
        the humectant is at least one component selected from trimethylolpropane, hexylene glycol, and saccharide;
        an average primary particle size of the silver particle is in the range from 10 nm to 100 nm;
        a particle size d90 of the silver particle in a grain size accumulation curve is in the range from 50 nm to 1 μm;
        the humectant is contained in an amount that is in the range from 5 weight % to 20 weight %;
        a particle size d10 of the silver particle in a grain size accumulation curve is in the range from 2 nm to 20 nm; and
        the aqueous ink composition has a gloss at an angle of 20° having a maximum that is 700 or larger.

2. The aqueous ink composition according to claim 1, wherein the silver particle is subjected to surface treatment.

3. A recorded article on which an image is recorded using the aqueous ink composition according to claim 1.

4. A recorded article on which an image is recorded using the aqueous ink composition according to claim 2.

* * * * *